United States Patent [19]
Foley

[11] Patent Number: 5,956,692
[45] Date of Patent: Sep. 21, 1999

[54] ATTRIBUTE INDUCTIVE DATA ANALYSIS

[75] Inventor: Thomas Aquinas Foley, Paxton, Mass.

[73] Assignee: Digital Equipment Corporation, Maynard, Mass.

[21] Appl. No.: 07/794,298

[22] Filed: Nov. 14, 1991

Related U.S. Application Data

[63] Continuation of application No. 07/286,346, Dec. 19, 1988, abandoned.

[51] Int. Cl.$^6$ .............................. G06F 17/60; G06F 19/00
[52] U.S. Cl. .................. 705/7; 364/468.03; 364/468.15; 364/468.16; 364/468.18; 705/11; 702/81; 702/82; 702/83; 702/84
[58] Field of Search ..................................... 364/400, 401, 364/402, 468, 478; 702/81, 82, 83, 84

[56] References Cited

U.S. PATENT DOCUMENTS

4,390,953  6/1983  Johnstone ........................... 364/474.19
4,691,317  9/1987  Miazga et al. ......................... 371/11.1

Primary Examiner—Stephen R. Tkacs
Attorney, Agent, or Firm—Dirk Brinkman

[57] ABSTRACT

A method and apparatus for monitoring a physical process comprising a plurality of interacting attributes where the attributes are components of the physical process. The method and apparatus locates defective attributes and defective interactions between interacting attributes within the physical process. The apparatus comprises a processor, and input member and a hierarchical data structure. Data concerning the attributes of the physical process are input and organized into the hierarchical data structure. A response variable and a variation in the response variable for each population in the hierarchical data structure is determined, and used to identify defects in the physical process.

26 Claims, 2 Drawing Sheets

ATTRIBUTE INDUCTIVE DATA ANALYSIS

This application is a continuation of application Ser. No. 07/286,346, filed Dec. 19, 1988 now abandoned.

BACKGROUND OF THE INVENTION

This invention relates to the analysis of data sets characterized by attribute data and, more specifically, the identification of possible sources of variation in a response variable defined on the data set.

There are a wide variety of situations where a data set (or a collection of data) may need to be analyzed to locate sources of variation in a response variable associated with the data. For example, such a data set can be based on a manufacturing process and would be derived from attributes such as specific machines, operators, components etc. Each product produced by such a manufacturing process will have a plurality of attribute derived data associated with it. Considering, e.g., the production of computer components, where each component is produced in a process where many machines are controlled by different operators, such data may define the "history" of each component, including a complete list of the data associated with its production, such as the operator(s) and machine(s) used to produce it.

In such a manufacturing process there will be some components produced that are defective. The process will therefore have some incidence of defects or fraction defective (which is defined as the number of defective products divided by the total number of products) associated with it. The fraction defective would be a response variable since it is a variable that is responsive to, or is dependent on, the attributes (i.e., the particular machines, operators etc.).

By analyzing such a data set, it may be possible to identify sources of variation in the response variable. For example, if a particular machine is malfunctioning, then products produced on that machine will tend to have a higher fraction defective than products produced on other machines. The malfunctioning machine will therefore cause a variation in the response variable (i.e. fraction defective). If this variation can be isolated, the malfunctioning machine will be identified, thereby providing an opportunity to improve the manufacturing process and reduce the overall number of defective products produced.

In addition to individual attributes such as an individual machine or operator causing defects, attribute interactions expressed by interactions of attributes may also be the source of a variation in the response variable. For example, if a particular operator is unskilled in the use of one machine then those products that have been produced by the interaction of that machine and operator may have a high fraction defective. The individual attributes, i.e. the operator himself or the machine itself, will not have as high an incidence of defects as the interaction of the attributes. It should be apparent that in a complicated manufacturing process where a large number of machines, operators, components, etc. are involved, there are an enormous number of different combinatoric possibilities that could account for defective products. Identifying the individual attributes or attribute interactions that best maximize the significance of variations in the response variable is essential if the quality of the products is to be improved.

Traditionally, quality control engineers isolate sources of variation by analyzing data derived from the particular manufacturing process. Bar graphs (e.g. Paretos) are typically constructed plotting the absolute number of defects or the fraction defective (typically normalized) associated with many different attributes. By evaluating the various fraction defectives for attributes, hypotheses are drawn as to the likely causes of defects (i.e., either an individual attribute or some interaction of attributes). The hypotheses may then be tested by conducting controlled experiments.

SUMMARY OF THE INVENTION

The invention generally features a system and method for determining which populations in an attribute characterized data set best maximize the significance of variations in a response variable of the data set, the data set being organized into populations characterized by individual attributes or interactions of attributes, the system comprising: means for identifying the population that has the most significant variation in the response variable; means for revising the data set to eliminate the effects of the variation in the response variable associated with the identified population; and means for identifying the population in the revised data set that has the most significant variation in the response variable.

In the preferred embodiment, each of the means for identifying comprises: means for selecting as a test population a universe population comprising all of the data set; means for identifying the subpopulation of said test population that has the largest variation in the response variable; and means for selecting as a new test population the subpopulation identified by said identifying means if the variation in the response variable of the identified subpopulation is greater than a threshold. The system further includes means for determining if the test population is equal to the universe population. The data set is derived from a manufacturing process and the attributes are manufacturing parameters such as specific machines, operators, etc. The response variable is a fraction defective and the variation in the fraction defective of a population is a variation relative to the fraction defective of the population's complement.

The invention also generally features a system and method for determining which populations in an attribute characterized data set best maximize the significance of variations in a response variable of the data set, the data set organized into populations characterized by individual attributes or interactions of attributes, the system comprising: means for selecting as a test population a universe population comprising all of the data set; means for identifying the subpopulation of said test population that has the most significant variation in the response variable; and means for selecting as a new test population the subpopulation identified by said identifying means if the variation in the response variable of the identified subpopulation is greater than a threshold.

The invention also generally features a method for determining which populations in an attribute characterized data set best maximize the significance of variations in a response variable of the data set, the data set being organized into populations characterized by individual attributes or interactions of attributes, the method comprising the steps of: (a) selecting as a test population a universe population comprising all of the data set; (b) identifying the subpopulation of the test population that has the largest variation in the response variable; (c) comparing the variation in the response variable of the subpopulation chosen in step b to a threshold and, if the variation is greater than the threshold, selecting as a new test population the chosen subpopulation and returning to step b; (d) determining if the test population is equal to the universe population, the method being complete if equal; and (e) eliminating the effects of the variation in said response variable associated with the test population and returning to step a.

The system and method of the invention are significant improvements over the prior art. In a typical prior art method, engineers look at data and speculate as to likely sources of defects. The invention automatically organizes data into populations and performs a recursive search of the data to identify the most likely sources of defects. The data set is searched in a process that narrows down the sources of defects as specifically as possible to facilitate the improvement of the manufacturing process. Furthermore, once a source of defects has in fact been identified, the data is revised to eliminate all effects of that source of defects on the data. In this way, multiple independent sources can be isolated.

DESCRIPTION OF THE PREFERRED EMBODIMENT

OPERATION

Using the novel method of the invention (called attribute inductive data analysis or "AIDA") data sets are analyzed to identify sources of variations in a response variable associated with the data. To illustrate how AIDA identifies sources of variations, an illustrative data set will be considered. Table 1 lists defect data that might be derived from an illustrative manufacturing process in which four machines ($M_1$, $M_2$, $M_3$ and $M_4$) were used to produce two types of products, namely, product one ($P_1$) and product two ($P_2$).

TABLE 1

|  | $P_1$ | $P_2$ | Total |
|---|---|---|---|
| $M_1$ | 1/25 | 2/75 | 3/100 |
| $M_2$ | 3/25 | 3/75 | 6/100 |
| $M_3$ | 4/25 | 11/75 | 15/100 |
| $M_4$ | 1/25 | 1/75 | 2/100 |
| Total | 9/100 | 17/300 |  |

The numerators in each fraction represent the number of defects while the denominators represent the total number of products produced. For example, each machine produced twenty-five products $P_1$ and seventy-five products $P_2$ and machine $M_3$ produced four defective products $P_1$ and eleven defective products $P_2$.

The AIDA method, as applied to this data set, may be used to identify possible sources of variations in the response variable (which in this case is the fraction defective). In other words, if the manufacturing process has a source of defects, it will be manifested by a variance in the fraction defective among populations in the data set, as explained more fully below. For example, if machine $M_1$ is not properly set up to produce products $P_2$, this may result in a higher incidence of defects for products $P_2$ that are produced on machine $M_1$ while products $P_2$ produced by the other machines and other products produced by machine $M_1$ should not be responsible for sources of variations.

Figure 1:
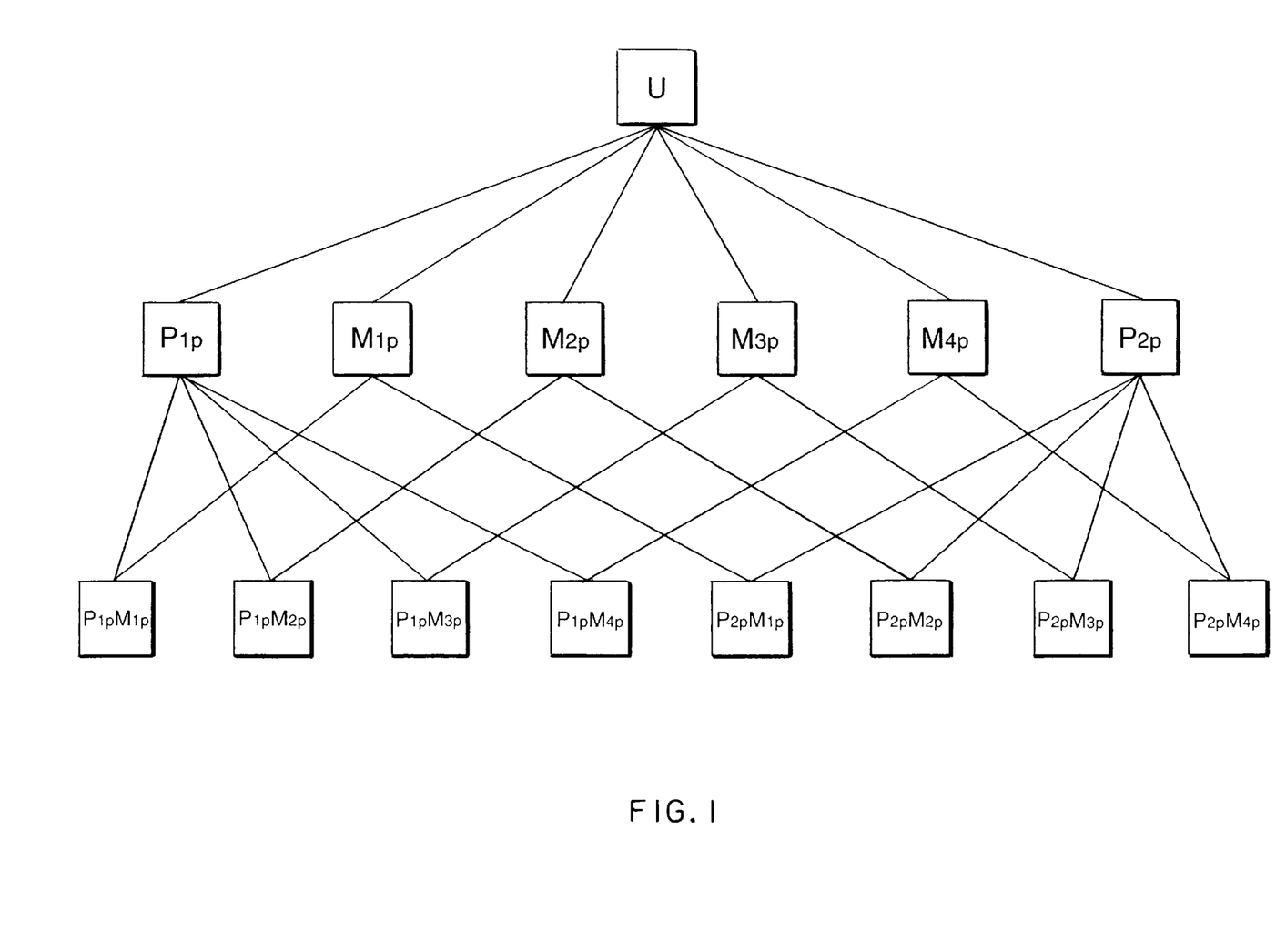
FIG. 1 is an illustration useful in understanding the operation of the invention and represents all of the possible populations associated with an illustrative data set.

The invention comprises a system that first organizes the data into populations, each population determined by either a single attribute or a conjunction of zero or more attributes (a universe population is defined as being specified by the union of all other populations, and therefore specifies the entire data set). In the illustrative manufacturing process the attribute values are $M_1$, $M_2$, $M_3$, $M_4$, $P_1$ and $P_2$. FIG. 1 shows all of the possible populations derived from the illustrative data set. The universe population ("U") appears at the top of the figure with populations defined by single attributes shown as "subpopulations" of U. For example, the population $M_{1p}$ is defined as data derived from products produced by $M_1$. The subpopulations of each of the single attribute populations are then shown in the bottom of FIG. 1. For example, the population specified by the conjunction of $P_{1p}$ and $M_{3p}$ (i.e., $P_{1p}M_{3p}$) is both a subpopulation of $P_{1p}$ and a subpopulation of $M_{3p}$ and represents the products $P_1$ produced by $M_3$ (i.e. the intersection of $P_{1p}$ and $M_{3p}$). Populations $P_{1p}$ and $M_{3p}$ are also referred to as "parent" populations of $P_{1p}M_{3p}$. It should be readily apparent that in a complicated manufacturing process with many attributes, the total number of populations would be enormous and the set relations extrememly complex.

Figure 2:
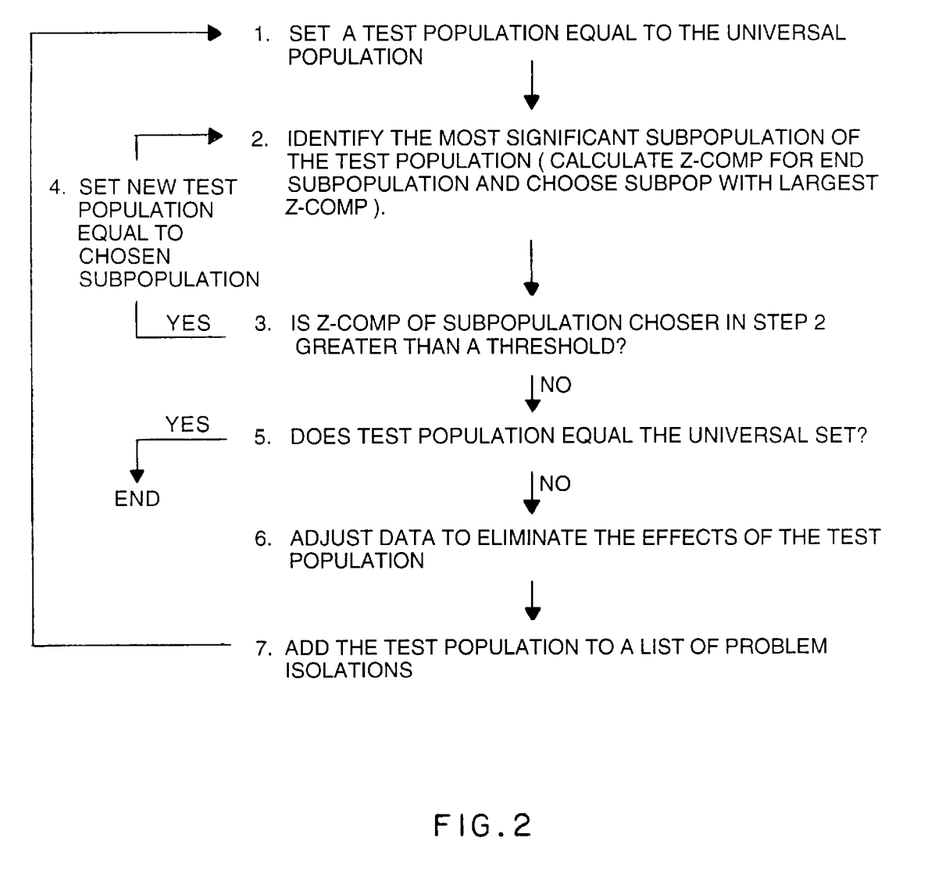
FIG. 2 is a flowchart describing the process of the preferred embodiment.

The system begins its search for sources of variation by defining a test population as being the universe population (see step 1 in FIG. 2). Next, each subpopulation of the test population is evaluated to determine: (1) which of the subpopulations has the most significant variation; and (2) whether the chosen subpopulation is a "significant" population (step 2 in FIG. 2). To determine the significance of a population's variation, it is compared with its complement. The complement of a population is that portion of the data set that remains when the population is subtracted from or removed from the data set. The complement of a subpopulation with respect to a parent population is all the data in the parent which remains when the subpopulation is subtracted from the parent.

The comparison of a population to its complement (i.e. step 2) is performed by calculating its "Z-Complement." The Z-Complement is a known statistical approximation for the comparison of probabilities of two binomial distributions. See, e.g., Lothar Sachs, Applied Statistics, page 338 (1982). In the context of this example, the Z-Complement is defined as a numerical measurement for the probability that a specific population has an intrinsically higher fraction defective than its complement. In other words, since the data set being analyzed is only representative of the manufacturing process, it is not an exact measurement of the true defect rate inherent in the process. However, the larger a variation in the fraction defective the higher the probability the variation is intrinsically greater than that for its complement. The Z-Complement measures this probability and is measured in units of standard deviations. As an example, a Z-Complement of 1.0 corresponds to a probability of 84.1%, while a Z-Complement of 3.0 corresponds to a probability of 99.9%.

To calculate the Z-Complement of $M_{1p}$, the fraction defective of $M_{1p}$ ("F") is first calculated as follows:

$$F = \frac{X}{N}$$

where X equals the total number of defects in the population and N equals the total number of opportunities for defects for the population of interest. For example, the number of opportunities for defects for the population $M_{1p}$ is the total number of products associated with this population (i.e., the total number of products produced by $M_1$). Referring to Table 1 above, it can be seen that for $M_1$, X=3 and N=100. Therefore, for $M_{1p}$ F equals 0.030. The fraction defective of the complement of $M_{1p}$ with respect to the current test population (the complement consisting of $M_{2p}+M_{3p}+M_{4p}$) is then calculated as follows:

$$F' = \frac{X'}{N'}$$

where F' is the complement fraction defective, X' is the total number of defects for the complement and N' is the total number of opportunities for defects. Referring again to Table 1, X' equals the total number of defects for $M_{2p}$, $M_{3p}$ and $M_{4p}$ combined (i.e., $M_{1p}$'s complement) which is 23. The total number of opportunities, N', is 300. Therefore F' equals 0.076. The Z-Complement ("Z") $M_{1p}$ can now be calculated as follows:

$$Z = \frac{F - F'}{\sqrt{\frac{F_p(1-F_p)}{N} + \frac{F_p(1-F_p)}{N'}}};$$

where $F_p$, the pooled fraction defective, is defined by the following:

$$F_p = \frac{X + X'}{N + N'}.$$

Performing these calculations for the data associated with $M_{1p}$ results in a Z-complement value of −1.64. Table 2 lists the calculated values for each subpopulation of the current test population (the universe population).

TABLE 2

| | Subpopulation Data | | Complement Data | | |
|---|---|---|---|---|---|
| | Frac. Def. | F | Frac. Def. | F' | Z |
| $M_{1p}$ | 3/100 | .030 | 23/300 | .077 | −1.64 |
| $M_{2p}$ | 6/100 | .060 | 20/300 | .067 | −0.23 |
| $M_{3p}$ | 15/100 | .150 | 11/300 | .037 | 3.98 |
| $M_{4p}$ | 2/100 | .020 | 24/300 | .080 | −2.11 |
| $P_{1p}$ | 9/100 | .090 | 17/300 | .057 | 1.17 |
| $P_{2p}$ | 17/300 | .056 | 9/100 | .090 | −1.17 |

The system then compares the highest subpopulation Z-Complement to a threshold value to determine if it is a significant population (step 3 in FIG. 2). The threshold value is selected considering the acceptable level of risk that an identified population may not have an intrinsically higher fraction defective and is therefore not a true source of varience. If the threshold in this example is set at 4.00, then $M_{3p}$, which has the highest Z-Complement, will not be a significant population, and there will be no significant subpopulations for this test population. Since the current test population is the universe population, the process will be finished (step 5 in FIG. 2), and the conclusion will be that there are no significant sources of variation for this data set. In other words, the defects are distributed throughout the data set such that it cannot be stated, with the degree of certainty determined by the threshold (which approaches a probability of 100% since the threshold is 4.0), that any one population is responsible for an unusually high number of defects.

However, it will be assumed that the threshold is, e.g. 3.0 (corresponding to a 99.9% probability), so $M_{3p}$ will be deemed a significant population (step 3) and will become the new test population (step 4).

The system then continues and examines the subpopulations of the new test population (step 2). Referring to FIG. 2, it can be seen that the subpopulations of $M_{3p}$ are $P_{1p}M_{3p}$ and $P_{2p}M_{3p}$. Performing the same mathematical calulations described above for these subpopulations results in the data in Table 3. Note that the complements are always defined with respect to the current test population. For example the complement of $P_{1p}M_{3p}$ with respect to $M_{3p}$ is $P_{2p}M_{3p}$ whereas the complement of $P_{1p}M_{3p}$ with respect to $P_{1p}$ is the combination of $P_{1p}M_{1p}$, $P_{1p}M_{2p}$ and $P_{1p}M_{4p}$. Accordingly, since the current test population is $M_{3p}$, the proper complement of $P_{1p}M_{3p}$ is $P_{2p}M_{3p}$ and the complement of $P_{2p}M_{3p}$ is $P_{1p}M_{3p}$.

TABLE 3

| | Subpopulation Data | | Complement Data | | |
|---|---|---|---|---|---|
| | Frac. Def. | F | Frac. Def. | F' | Z |
| $P_{1p}M_{3p}$ | 4/20 | .200 | 11/80 | 0.137 | .70 |
| $P_{2p}M_{3p}$ | 11/80 | .137 | 4/20 | 0.200 | −.70 |

While $P_{1p}M_{3p}$ has a higher Z-Complement than $P_{2p}M_{3p}$, its Z-Complement is not greater than the threshold (step 3). Since the current test population (i.e., $M_{3p}$) is not the universe population (step 5), the system will add $M_{3p}$ as the new "cover" (the use of the term cover is explained below).

The data is revised as if the defects produced by $M_3$ never occurred (step 6). The populations affected will be $M_{3p}$ and any intersecting populations (i.e. $P_{1p}$, $P_{2p}$, $P_{1p}M_{3p}$ and $P_{2p}M_{3p}$). Once the system locates a source of variance in the data set, it revises the data to eliminate that source (i.e., the defect data is "covered"). The revised data set can now be evaluated to determine if other sources of variance in the fraction defective exist which are independent of the source associated with the covered population (i.e., independent of $M_{3p}$). Since the cover is an isolated source of variation, it is added to a list of isolated sources of variation as is each cover determined throughout the process (step 7). The revised data set appears in Table 4.

TABLE 4

| | $P_1$ | $P_2$ | Total |
|---|---|---|---|
| $M_1$ | 1/25 | 2/75 | 3/100 |
| $M_2$ | 3/25 | 3/75 | 6/100 |
| $M_3$ | 0/25 | 0/75 | 0/100 |
| $M_4$ | 1/25 | 1/75 | 2/100 |
| Total | 5/100 | 6/300 | |

To locate these other possible sources, the system returns to step 1 in FIG. 1 and again sets the test population equal to the universe population (note that the universe population is now defined with respect to the revised data set). All of the Z-Complements are calculated based on the revised data set using the formulas described above. Table 5 lists the results of these calculations.

TABLE 5

|  | Subpopulation Data | | Complement Data | | |
| --- | --- | --- | --- | --- | --- |
|  | Frac. Def. | P | Frac. Def. | P' | Z |
| $M_{1p}$ | 3/100 | .030 | 8/300 | .027 | 0.18 |
| $M_{2p}$ | 6/100 | .060 | 5/300 | .017 | 2.29 |
| $M_{3p}$ | 0/100 | .000 | 11/300 | .037 | −1.94 |
| $M_{4p}$ | 2/100 | .020 | 9/300 | .030 | −0.53 |
| $P_{1p}$ | 5/100 | .050 | 6/300 | .020 | 1.59 |
| $P_{2p}$ | 6/300 | .020 | 5/100 | .050 | −1.59 |

The revisions to the data set caused by covering $M_{3p}$ are apparent in Table 5. While the individual fraction defectives of the other machine populations remain the same, the complement data is affected and the resulting Z-Complement values are changed.

Using the same threshold as above (i.e., 3.0), the system would conclude that $M_{2p}$, the subpopulation with the highest fraction defective, is not a significant subpopulation (step 3) and, since our test population is the universe population, the process would end (step 5).

It should now be apparent that the lower the threshold the more sensitive the analysis becomes. A very low threshold will generally result in more sources of variation being isolated.

To summarize the AIDA system, the universe population is initially chosen as a test population and each of its subpopulations is evaluated to see if one is significantly different from the others. If none are, then the defects are fairly evenly dispersed throughout the data set and there is no one particular source of variance in terms of the attributes being evaluated. If, however, one of the subpopulations is significant then the system makes that subpopulation the new test population to see if the source of variance can be narrowed down even further. Accordingly, referring to FIG. 1, the system starts at the top of the figure and proceeds down from one population to another to locate sources of variance. When it locates such a source, it "covers" it and starts over again to look for other sources of variation. This process continues until no new sources of variation can be located.

When the process has been completed, the resulting information (the individual covers) can be used to help infer root causes regarding defects in the manufacturing process itself. For example, $M_{3p}$ was determined to be the only source of variation in the above example (using a threshold of 3.0) which might indicate that $M_3$ is not operating properly. Since the other three machines produce the same products as this machine, we may infer that the products themselves are not defective, (e.g., due to bad raw materials) but that the fault lies with $M_3$.

Although a relatively simple data set was analyzed above, other data sets can have many attributes. Furthermore, the illustrative data set was uniform (e.g. each machine produced 100 products), but the system can be used to analyze non uniform data sets, even if some populations are empty.

Other embodiments of the invention are within the scope of the appended claims.

I claim:

1. A computer based apparatus for monitoring a physical process and enabling identification of a source of defect in the physical process, the physical process comprising a plurality of interacting attributes, the attributes being components of the physical process, said plurality of interacting attributes and said interactions between said plurality of interacting attributes each having in ideal condition a predetermined desired state, wherein the apparatus locates defective ones of the plurality of interacting attributes and defective interactions between the plurality of interacting attributes within the physical process to enable identification of the source of defect in the physical process for subsequent physical adjustment of the source of defect, the apparatus comprising:

a. means for monitoring said plurality of interacting attributes and said interactions between said plurality of interacting attributes and generating a data set comprising instances of data concerning each one of the plurality of interacting attributes and the interactions between the plurality of interacting attributes of the physical process, said instances of data comprising instances of deviation of said plurality of interacting attributes and said interactions between said plurality of interacting attributes from their respective predetermined desired states;

b. a hierarchical data structure comprising populations which correspondingly represent one of the plurality of interacting attributes of the physical process or one of the interactions between the plurality of interacting attributes of the physical process, the hierarchical data structure comprising:

(i) a first level including a universe population which is a union of all populations, (ii) a second level including a first plurality of populations which correspondingly represent one of the plurality of interacting attributes of the physical process, and (iii) a plurality of subsequent levels including a second plurality of populations representative of the interactions between the plurality of interacting attributes, wherein the second plurality of populations at each one of the plurality of subsequent levels correspondingly represent an additional interaction between the plurality of interacting attributes than at a previous one of the plurality of subsequent levels;

c. means, coupled to the hierarchical data structure and to the monitoring means, for substituting the data set into the hierarchical data structure; and d. means, coupled to the hierarchical data structure, including (i) means for identifying a response variable for each population, the response variable for a population being a representation of the operation of the interacting attributes of the population in relation to an ideal operation of the interacting attributes in a physical process where no defects occur, (ii) means for comparing the response variable of each population with the response variable of other populations in the hierarchical data structure, (iii) means for determining a variation in the response variable for each population, and (iv) means for identifying a defective population to be a population having the most significant variation in its response variable, significance being determined by a first preselected scheme such that the identified population corresponds to the individual one of the plurality of interacting attributes or an interaction between the plurality of interacting attributes which is the most likely source of a defect within the physical process.

2. The apparatus of claim 1 further comprising:

a. means for storing an identifying reference as a first identified population to the population in the hierarchical data structure corresponding to the individual one of the plurality of interacting attributes or the interaction between the plurality of interacting attributes that is the most likely source of a defect within the physical process;

b. means for determining whether the first identified population is a significant population, significance being determined according to a second preselected scheme;

c. means for creating a revised data set when the first identified population is not a significant population by revising the data in the data set to eliminate the variation in the response variable of the first identified population; and d. means for identifying a second identified population in the revised data set, the second identified population corresponding to an individual one of the plurality of interacting attributes or an interaction between the interacting attributes in the physical process that is defective independent of the first identified population and has the most significant variation in its response variable, significance determined by the first preselected scheme.

3. The apparatus of claim 1 further comprising:

a. means for selecting as a test population the universe population;

b. means for identifying an identified population at a subsequent level of the hierarchical data structure to the test population that has the most significant variation in the response variable, significance being determined by the first preselected scheme;

c. means for determining whether the identified population is a significant population, significance being determined according to a second preselected scheme;

d. means for determining whether the test population is equal to the universe population;

e. means for selecting as a new test population the identified population if the identified population is a significant population;

f. means for determining when all of the populations in the hierarchical data structure at levels subsequent to the test population do not have a significant variation in their response variable, significance being determined by the first preselected scheme;

g. means for halting the computer based apparatus when the test population is equal to the universe population; and h. means for outputting the identified population having a significant variation in its response variable and identified as a significant population as the population representative of the individual one of the plurality of interacting attributes or the interaction between the plurality of interacting attributes which is the most likely source of a defect within the physical process.

4. The apparatus of claim 2 or 3 wherein the second preselected scheme comprises determining whether the variation in the response variable of a population is greater than a threshold value, the threshold value being a predetermined value representative of a level of risk that the population may be more defective than other populations.

5. The apparatus of claim 1 wherein the data set is derived from a manufacturing process.

6. The apparatus of claim 1 wherein each one of the plurality of interacting attributes are parameters from a manufacturing process.

7. The apparatus of claim 1 wherein the response variable for each population is a fraction defective, the fraction defective being the total number of defects in the population divided by the total number of opportunities for defects in the population.

8. The apparatus of claim 1 wherein the variation in the response variable is a known statistical approximation measuring the fraction defective of a population relative to the fraction defective of the population's complement, the complement of a population being that portion of the data set that remains when the population is removed from the data set.

9. The apparatus of claim 1 wherein the first preselected scheme comprises selecting the population with the largest variation in its response variable.

10. A device for monitoring a physical process and locating defective ones of a plurality of interacting attributes and interactions between the plurality of interacting attributes of the physical process to enable identification of the source of defect in the physical process for subsequent physical adjustment of the source of defect, said plurality of interacting attributes and said interactions between said plurality of interacting attributes each having in ideal condition a predetermined desired state, the device comprising:

a1. means for monitoring said plurality of interacting attributes and said interactions between said plurality of interacting attributes and generating an attribute characterized data set comprising instances of data concerning each one of said plurality of interacting attributes and said interactions between said plurality of interacting attributes of the physical process, said instances of data comprising instances of deviation of said plurality of interacting attributes and said interactions between said plurality of interacting attributes from their respective predetermined desired states;

a2. means for receiving as input said attribute characterized data set comprising instances of data concerning each one of the plurality of interacting attributes and the interactions between the plurality of interacting attributes of the physical process;

b. a hierarchical data structure comprising populations which correspondingly represent one of the plurality of interacting attributes of the physical process or one of the interactions between the plurality of interacting attributes of the physical process, the hierarchical data structure comprising:

(i) a first level including a universe population which is a union of all populations, (ii) a second level including a first plurality of populations which correspondingly represent one of the plurality of interacting attributes of the physical process, and (iii) a plurality of subsequent levels including a second plurality of populations representative of the interactions between the plurality of interacting attributes, wherein the second plurality of populations at each one of the plurality of subsequent levels correspondingly represent an additional interaction between the plurality of interacting attributes than at a previous one of the plurality of subsequent levels;

c. means coupled to the means for receiving for organizing the attribute characterized data set into a hierarchical data structure;

d. means for identifying a response variable for each population, the response variable for a population being a numerical representation of the operation of the attributes comprising the population in relation to an ideal operation of the attributes in a physical process where no defects occur; and e. a processor, coupled to the hierarchical data structure, for selecting defect populations in the hierarchical data structure, wherein a defect population is the population that has a response variable that identifies it as representing one of the plurality of interacting attributes or combination of interacting attributes that is a likely source of a defect within the physical process.

11. The device of claim 10 wherein the means for selecting defect populations further comprises:

a. means for selecting as a test population the universe population;

b. means for determining if the test population is equal to the universe population;

c. means for determining a variation in the response variable for each population;

d. means for identifying an identified population at a subsequent level of the hierarchical data structure to the test population that has the most significant variation in its response variable, significance being determined by a scheme that selects the population with the largest variation in its response variable;

e. means for selecting as a new test population the identified population if the variation in the response variable of the identified population is greater than a threshold value, the threshold value being a predetermined value representative of the level of risk that the identified population is more defective than other populations in the hierarchical data structure;

f. means for storing in a list of isolated sources of variations a reference to the identified population if the variation in its response variable is not greater than the threshold value;

g. means for creating a revised data set when the variation in the response variable of the identified population is not greater than the threshold value by revising the data in the data set to eliminate the variation in the response variable associated with the identified population;

h. means for reselecting as the test population the universe population when the variation in the response variable of the identified population is not greater than the threshold value;

i. means for determining when all of the populations in the hierarchical data structure at subsequent levels to the test population do not have a significant variation in their response variable;

j. means for terminating the operation of the device when the test population is equal to the universe population; and k. means for outputting the populations stored in the list of isolated sources of variations, the populations representative of the interacting attributes and interactions between the plurality of interacting attributes which are the most likely sources of defect within the physical process.

12. The device of claim 10 wherein the interacting attributes are interacting components in a manufacturing process.

13. A method for monitoring a physical process and identifying defective combinations of components in the physical process to enable subsequent physical adjustment of the source of defect in the physical process, the physical process comprising a plurality of interacting components, the components being represented by attributes of the physical process, said attributes each having in ideal condition a predetermined desired state, the method comprising the steps of:

a. monitoring said physical process and gathering a data set comprising instances of data concerning each one of a plurality of interacting attributes of the physical process and interactions between the plurality of interacting attributes of the physical process, said instances of data comprising instances of deviation of said plurality of interacting attributes and said interactions between said plurality of interacting attributes from their respective predetermined desired states;

b. organizing the data set into a hierarchical data structure comprising populations which correspondingly represent one of the plurality of interacting attributes of the physical process or one of the interactions between the plurality of interacting attributes of the physical process, the hierarchical data structure comprising:

(i) a first level including a universe population which is a union of all populations, (ii) a second level including a first plurality of populations which correspondingly represent one of the plurality of interacting attributes of the physical process, and (iii) a plurality of subsequent levels including a second plurality of populations representative of the interactions between the plurality of interacting attributes, wherein the second plurality of populations at each one of the plurality of subsequent levels correspondingly represent an additional interaction between the plurality of interacting attributes than at a previous one of the plurality of subsequent levels;

c. identifying a response variable for each population, the response variable for a population being a numerical representation of the operation of the interacting components of the population in relation to an operation of the interacting components in a physical process where no defects occur;

d. comparing the response variable of each population with the response variable of the other populations in the hierarchical data structure;

e. determining a variation in the response variable for each population; and f. identifying a defective population in the hierarchical data structure as that population representative of one of the plurality of interacting attributes or one of the interactions between the interacting attributes that is the most likely source of defect within the physical process.

14. The method of claim 13 wherein the step of identifying the defective population further comprises the steps of:

a. selecting as a test population the universe population;

b. identifying an identified population at a subsequent level of the hierarchical data structure to the test population that has the most significant variation in the response variable, significance being determined by a preselected scheme;

c. selecting as a new test population the identified population if the variation in the response variable of the identified population is greater than a predetermined threshold value which is a predetermined value representative of the level of risk that the identified population may be more defective than other populations at the same level in the hierarchical data structure;

d. revising the data set if the variation in the response variable of the identified population is not greater than the threshold value;

e. determining when all of the populations at a level subsequent to the test population do not have a significant variation in their response variable;

f. determining if the test population is equal to the universe population; and g. terminating processing when the test population is the universe population.

15. The method of claim 14 wherein the step of revising the data set further comprises the steps of:

a. storing an identifying reference to the identified population in the hierarchical data structure;

b. revising the data set to eliminate the effects of the variation in the response variable associated with the identified population;

c. revising the hierarchical data structure to represent the revised data set;

d. selecting as the test population the universe population; and e. identifying a second defective population in the revised hierarchical data structure being that population which, when examining the variation in the response variable for each population, is the most likely source of a defect within the physical process.

16. The method of claim 14 wherein the step of identifying the identified population further comprises the steps of:

(i) determining a variation variable for each population which is a known statistical approximation measuring the response variable of a population relative to the response variable of the population's complement, the complement of a population being that portion of the data set that remains when the population is removed from the data set, (ii) determining a variation population at a subsequent level of the hierarchical data structure to the test population that has the largest variation variable, and (iii) identifying the variation population as the identified population.

17. The method of claim 13 wherein the data set is derived from a manufacturing process.

18. The method of claim 13 wherein the attributes are parameters of a manufacturing process.

19. The method of claim 13 wherein the response variable for each population is a fraction, the fraction being the total number of defects in the population divided by the total number of opportunities for defects in the population.

20. The method of claim 13 wherein the step of determining the variation in the response variable for each population comprises the step of determining a variation variable for each population which is a known statistical approximation measuring the response variable of a population relative to the response variable of the population's complement, the complement of a population being that portion of the data set that remains when the population is removed from the data set.

21. A method for monitoring a physical process which comprises a plurality of interacting attributes to determine whether any of said interacting attributes or interactions between said interacting attributes are behaving inefficiently so as to require alteration of the physical process, said plurality of interacting attributes and said interactions between said plurality of interacting attributes each having in ideal condition a predetermined desired state, the method comprising the steps of:

a1. monitoring said physical process and generating a data set comprising data representative of the behavior of said plurality of interacting attributes and the behavior of said interactions between said plurality of interacting attributes, said representative data comprising instances of deviation of said plurality of interacting attributes and said interactions between said plurality of interacting attributes from their respective predetermined desired states;

a2. storing said data set from step a1:

a3. retrieving as input said data set comprising data representative of the behavior of the plurality of interacting attributes and the behavior of the interactions between the plurality of interacting attributes;

b. organizing the data set into a hierarchical data structure comprising populations which correspondingly represent one of the plurality of interacting attributes of the physical process or one of the interactions between the plurality of interacting attributes of the physical process, the hierarchical data structure comprising:

(i) a first level including a universe population which is a union of all populations, (ii) a second level including a first plurality of populations which correspondingly represent one of the plurality of interacting attributes of the physical process, and (iii) a plurality of subsequent levels including a second plurality of populations representative of the interactions between the plurality of interacting attributes, wherein the second plurality of populations at each one of the plurality of subsequent levels correspondingly represents an additional interaction between the plurality of interacting attributes than at a previous one of the plurality of subsequent levels;

c. selecting as a test population the universe population;

d. calculating a statistical approximation value for each population at levels subsequent to the test population, the statistical approximation value being a known statistical approximation measuring the probability that a population has a greater variation than the complement of the population, a population's complement being that portion of the data set that remains when the population is removed from the data set;

e. identifying an identified population at a subsequent level to the test population that has the largest statistical approximation value;

f. determining whether the identified population is a significant population, significance being determined according to a pre-selected scheme;

g. if the identified population is a significant population,
(i) selecting as the test population the identified population, and
(ii) repeating steps (c) through (f) until it is determined that the identified population is not a significant population;

h. if the identified population is not a significant population and the test population is not the universe population,
(i) altering the data in the data set so that one of the plurality of interacting attributes or interactions between interacting attributes represented by the identified population does not have the largest statistical approximation value,
(ii) adding the test population to a list of isolated sources of variations, and
(iii) repeating steps (c) through (g) until it is determined that the test population is the universe population;

i. outputting the identities of the test populations in the list of isolated sources of variations; and j. using the test populations in the list of isolated sources of variations to determine whether any attributes or interactions between interacting attributes are behaving inefficiently so as to require alteration of the physical process.

22. The method of claim 21 wherein the data set is derived from a manufacturing process.

23. The method of claim 21 wherein the step of determining whether a population is a significant population further comprises the steps of:

(i) taking as input a predetermined threshold value,
   (ii) comparing the statistical approximation value of the population with the predetermined threshold value, and
   (iii) determining that the population is a significant population if the statistical approximation value of the population is greater than the predetermined threshold value.

24. For use in optimizing the operation of a physical process comprising a plurality of interacting attributes whose behavior affects the operation of the physical process, a computer-based method for monitoring and identifying individual ones of the plurality of interacting attributes and interactions between the plurality of interacting attributes of the physical process that vary from a preselected optimized state and require modification to optimize the operation of the physical process, the method comprising of the steps of:

a1. monitoring said physical process and generating a data set comprising data representative of the behavior of said plurality of interacting attributes and the behavior of said interactions between said plurality of interacting attributes;
   a2. storing said data set from step a1;
   a3. retrieving as input said data set comprising data representative of the behavior of the plurality of interacting attributes and the behavior of the interactions between the plurality of interacting attributes;
   b. organizing the data set to a hierarchical data structure comprising populations which correspondingly represent one of the plurality of interacting attributes of the physical process or one of the interactions between the plurality of interacting attributes of the physical process, the hierarchical data structure comprising:
      (i) a first level including a universe population which is a union of all populations,
      (ii) a second level including a first plurality of populations which correspondingly represent one of the plurality of interacting attributes of the physical process, and
      (iii) a plurality of subsequent levels including a second plurality of populations representative of the interactions between the plurality of interacting attributes, wherein the second plurality of populations at each one of the plurality of subsequent levels correspondingly represents an additional interaction between the plurality of interacting attributes than at a previous one of the plurality of subsequent levels;
   c. selecting as a test population the universe population;
   d. calculating a z-complement value for each population at a level subsequent to the test population, the z-complement value being a known statistical approximation measuring the probability that a population has a greater variation in behavior than the complement of the population, a population's complement being that portion of the data set that remains when the population is removed from the data set;
   e. identifying an identified population at a level subsequent to the test population that has the largest z-complement value;
   f. determining whether the identified population is a significant population, significance being determined according to a pre-selected scheme;
   g. if the identified population is a significant population,
      (i) selecting as the test population the identified population, and
      (ii) repeating steps (d) through (g) until it is determined that the identified population is not a significant population;
   h. if the identified population is not a significant population and the test population is not the universe population,
      (i) altering the data in the data set so that one of the plurality of interacting attributes or interactions between interacting attributes represented by the identified population do not vary from the preselected optimized state,
      (ii) adding the test population to a list of isolated sources of variations, and
      (iii) repeating steps (c) through (h) until it is determined that the test population is the universe population; and
   i. outputting the identities of the significant population which correspond to an identified one of the plurality of interacting attributes or an identified one of the interactions between the interacting attributes.

25. The method of claim 24 wherein the data set is derived from a manufacturing process.

26. The method of claim 24 wherein the step of determining whether a population is a significant population further comprises the steps of:

(i) taking as input a predetermined threshold value,
   (ii) comparing the z-complement value of the population with the predetermined threshold value, and
   (iii) determining that the population is a significant population if the z-complement value of the population is greater than the predetermined threshold value.

* * * * *